(12) United States Patent
Michie et al.

(10) Patent No.: US 11,174,088 B2
(45) Date of Patent: Nov. 16, 2021

(54) VACUUM PACKAGING AND SEALING APPLIANCE

(71) Applicant: Sunbeam Products, Inc., Boca Raton, FL (US)

(72) Inventors: John K. Michie, Kalamazoo, MI (US); Monica G. Lichty, Kalamazoo, MI (US); Yiyun Zhou, Xiamen (CN)

(73) Assignee: Sunbeam Products, Inc., Boca Raton, FL (US)

( * ) Notice: Subject to any disclaimer, the term of this patent is extended or adjusted under 35 U.S.C. 154(b) by 246 days.

(21) Appl. No.: 16/294,831

(22) Filed: Mar. 6, 2019

(65) Prior Publication Data

US 2019/0276217 A1    Sep. 12, 2019

Related U.S. Application Data

(60) Provisional application No. 62/639,805, filed on Mar. 7, 2018.

(51) Int. Cl.
| | |
|---|---|
| *B65D 81/20* | (2006.01) |
| *B65D 53/06* | (2006.01) |
| *B29C 65/00* | (2006.01) |
| *B29C 65/18* | (2006.01) |

(52) U.S. Cl.
CPC ......... *B65D 81/2038* (2013.01); *B29C 65/18* (2013.01); *B29C 66/71* (2013.01); *B65D 53/06* (2013.01); *A23V 2002/00* (2013.01); *B65D 81/2023* (2013.01)

(58) Field of Classification Search
None
See application file for complete search history.

(56) References Cited

U.S. PATENT DOCUMENTS

| | | | | |
|---|---|---|---|---|
| 2005/0217101 | A1* | 10/2005 | Small | B65B 51/148 53/510 |
| 2006/0230711 | A1* | 10/2006 | Higer | B65B 51/146 53/512 |
| 2012/0090281 | A1* | 4/2012 | Abate | B65B 31/046 53/510 |
| 2013/0097967 | A1* | 4/2013 | Picozza | B65B 31/00 53/408 |
| 2013/0232925 | A1* | 9/2013 | Huang | B65B 51/148 53/510 |
| 2015/0232210 | A1* | 8/2015 | Sung | B29C 66/8221 53/509 |

(Continued)

*Primary Examiner* — Anna K Kinsaul
*Assistant Examiner* — Chinyere J Rushing-Tucker
(74) *Attorney, Agent, or Firm* — Husch Blackwell LLP

(57) ABSTRACT

The invention comprising an appliance for vacuum sealing a bag member. The appliance has a housing including a front wall, a rear wall, and two side walls. The front wall includes an opening for receiving an open top portion of the bag member, where the bag member can then be received within a drip tray placed within a cavity located within the housing, where vacuum pressure may be applied. The drip try includes a barrier member that extends upwardly at a rear portion to redirect the open top portion of the bag member into the drip tray when the bag member has been inserted into the opening. The cavity also includes a heating bar used to apply a seal to the open top portion of the bag member. The front wall of the housing is angled between 15° and 45° relative to a surface on which the appliance rests.

17 Claims, 3 Drawing Sheets

(56) References Cited

U.S. PATENT DOCUMENTS

| | | | |
|---|---|---|---|
| 2015/0367973 A1* | 12/2015 | Owens | B65B 31/048 53/408 |
| 2016/0101885 A1* | 4/2016 | Ledger | B65B 31/00 53/110 |
| 2016/0324196 A1* | 11/2016 | Bocks | B65B 31/024 |

* cited by examiner

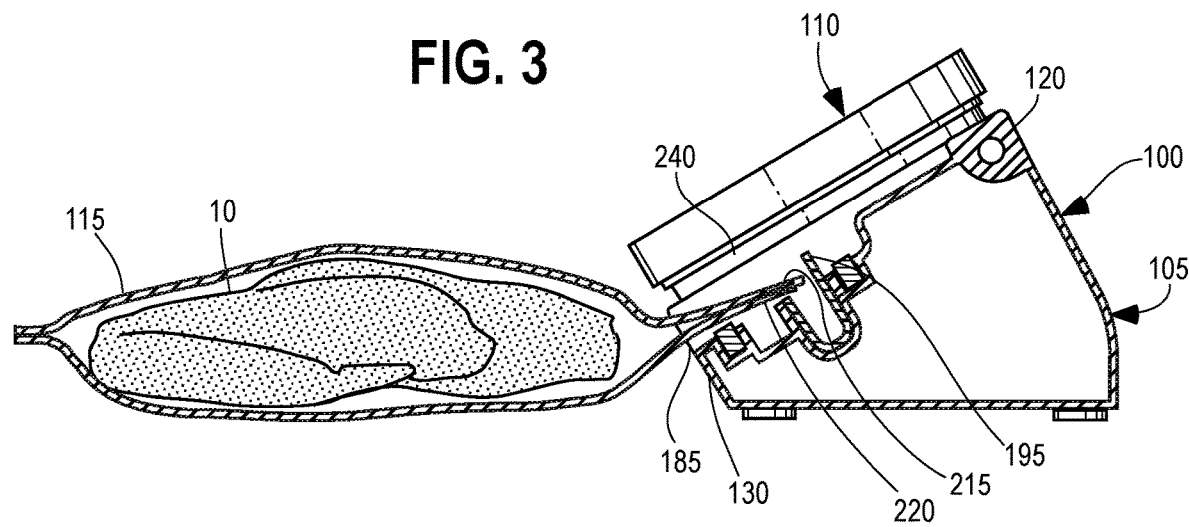
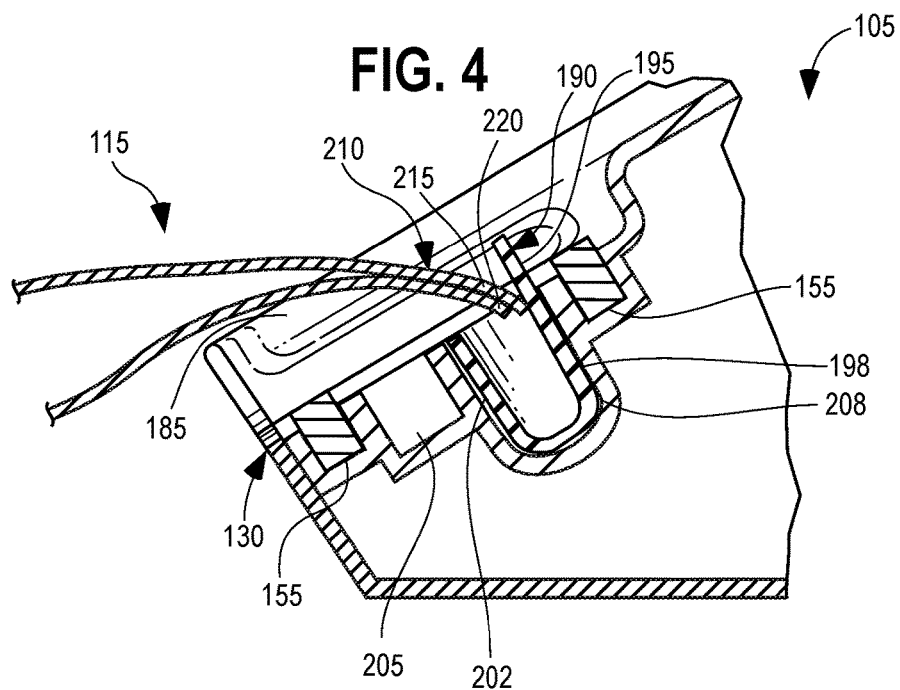

VACUUM PACKAGING AND SEALING APPLIANCE

CROSS-REFERENCE TO RELATED APPLICATIONS

This application claims the benefit of U.S. Provisional Application No. 62/639,805, filed Mar. 7, 2018, which is hereby incorporated by reference in its entirety.

BACKGROUND OF THE INVENTION

The present invention relates generally to food storage. More particularly, it relates to a vacuum packaging and sealing appliance that is configured to create a vacuum in a food storage bag and subsequently seal the top of the bag so that food products may be stored within the bag in a freezer, refrigerator, pantry or other food storage area under vacuum until ready for use. By being stored in a vacuum sealed bag, the food products stored in the bag may be preserved for longer periods of time.

Storing food, vegetables, herbs, preparation ingredients and leftovers is common practice. Often these products are stored in ordinary food storage bags which can be placed in freezers, refrigerators, pantries and other storage locations, and closed using an interlocking seal or zipper closure. Over short periods of time, food stored in ordinary food storage bags will spoil, waste, or become unusable and will have to be thrown away. Thus, vacuum sealing food products within a bag has been known to extend the freshness and useful life of food products stored, thereby reducing food waste and spoilage.

An example prior art vacuum packaging and sealing appliance 1, hereinafter referred to as appliance 1, is shown in FIG. 1. The appliance 1 is shown receiving a sealable bag member 5 with a food product 10 contained therein. One end portion 15 of the bag member 5 is already sealed, but its opposite end portion 20, which includes top and bottom side edge portions 25, 30, remains open and unsealed so that food products can be stored within the bag member 5.

An opening 35 in the appliance 1 preferably receives the open end portion 20 of the bag member 5 so that it may be vacuumed and sealed. The opening 35 associated with a typical vacuum appliance such as appliance 1 is located on the front wall of the appliance which is positioned and located substantially perpendicular to the supporting surface on which it rests. In order to be inserted into the opening 35 which is spaced at a distance above the supporting surface as illustrated in FIG. 1, the bag member 5 and its food product 10 must be lifted upwardly toward the opening 35. Upward lifting of the bag member 5 and its open end portion 20 can cause the food product 10 to apply a gravitational force downwardly on the bag member 5. The resulting gravitational force causes the bottom side edge portion 30 of the bag member 5 to be pulled downwardly and away from the top side edge portion 25 of the bag member 5 such that the top and bottom side edge portions 25, 30 become substantially misaligned with one another as shown in FIG. 1. As such, top side edge portion 25 of the open end portion 20 of the bag is spaced at a distance from the bottom side edge portion 30 of the open end portion 20 of the bag member 5. As a result, the top side edge portion 25 of the open end portion 20 of the bag member 5 ends up substantially farther into the opening 35 than the bottom side edge portion 30 of the open end portion of the bag member 5, as shown in FIG. 1.

In order for the appliance 1 to pull a vacuum in the bag member 5, the top and bottom side edge portions 25 and 30 of the open end of the bag must be inserted into a drip tray 40 for proper positioning within the vacuum chamber of the appliance. If both edge portions 25 and 30 of the open end 20 of the bag member 5 are not positioned in the tray 40 as illustrated in FIG. 1, the bag member 5 will not be vacuum sealed as the open end 20 of the bag will be outside the vacuum chamber thereby preventing a proper seal. In this situation, a user will have to lift the bag member 5 and its food product 10 and move the top and bottom edge portions 25 and 30 of the open end 20 of the bag member 5 into a better alignment and into the drip tray 40 so that a vacuum can be pulled on the bag member 5. Over-insertion of the bag member 5 into the appliance can also cause failures when sealing as the open edge portions 25, 30 of the bag member 5 may again lay outside the vacuum chamber.

The height and angle of the appliance 1 can also create issues when placing bags in the vacuum chamber especially if the bag has little head space. As explained, the bag wants to slide down and out of the appliance. A user then needs to use two hands to realign the open end portion of the bag so that it does not slide out of the vacuum chamber.

In prior art appliances like the appliance 1, when a user inserts a bag such as the bag member 5 into the appliance 1, he or she does not have any sort of reassurance that the top and bottom side edge portions 25, 30 of the bag member 5 have sufficiently entered the vacuum chamber for efficient vacuuming and sealing. Instead, he or she must rely on experience and "feel" to know whether the bag member 5 has gone far enough into the appliance 1. Misalignment of the top and bottom side edges 25, 30 of the open end 20 of the bag member 5 can also cause problems when the appliance 1 applies heat via a heating bar 45 located at a front portion 50 of the appliance 1 to seal the open end portion 20 of the bag member 5. These uneven portions may cause an improper seal which can cause a loss of the vacuum within the bag and later spoilage of that food product within the bag member 5.

The drip tray 40 also acts to collect moisture that may be present in the bag when a vacuum force is applied to the bag member 5 in a manner understood and known in the art. The drip tray 40 usually can be removed from the appliance 1 in a manner known and understood in the art so that it may be cleaned. The drip tray 40 of the appliance 1 is substantially U-shaped and its upper end portions do not extend upwardly into the opening 35 of the appliance 1. Instead, the U-shaped end portions of the drip tray 40 lie substantially level with the heating bar 45 and do not contact the open end portion 20 of the bag member 5 when the bag member 5 has been substantially inserted into the opening 35. An operator is thus left guessing as to whether the open end portion 20 of the bag member 5 has been sufficiently inserted into the appliance 1 such that it actually extends down into the drip tray 40 and the vacuum chamber. Some prior art appliances may include tabs that stick up within the appliance that act as stops, but those are often not removable for cleaning and fail to provide a side-to-side limit stop or guide when trying to align the open end portion of the bag with the drip tray.

Appliances like the appliance 1 may also be used with a valve assembly that is associated with the lid member of a food storage container in which food products may be vacuum sealed to increase food product shelf life. Such a food storage container is configured to allow an appliance like the appliance 1 to be attached thereto, for example, by a hose, so that food products stored within the container can be stored in a refrigerator, pantry, or other food storage area under vacuum for everyday use.

In such a use, typically a user places the valve assembly on a food storage container in communication with an accessory hose assembly associated with the vacuum appliance. The hose assembly is non-removably attached to the appliance like the appliance 1. A user may then activate a seal and vacuum button on the appliance substantially the same as the button that is used to activate the appliance 1 to seal and vacuum a bag such as the bag member 5. However, when the appliance 1 is used in association with a food storage container rather than a bag such as the bag member 5, the sealing feature and activation of the heating bar 45 is not necessary since no bag needs to be sealed. Nonetheless, because the same button is used to operate the appliance 1 for either a bag member such as the bag member 5 or a container, a heat bar like the heating bar 45, is activated in both cases. When the container is used instead of the bag, this is an unnecessary step that can generate unnecessary power and place unnecessary wear and tear on the heating bar 45.

It is therefore desirable to provide a vacuum packaging and sealing appliance that improves the alignment of top and bottom edge portions of the open end portion of a bag when it is inserted into the vacuum packaging and sealing device. The device should also facilitate proper alignment and insertion of the bag member into the vacuum chamber and prevent a bag from being over inserted into the device. Finally, the improved vacuum packaging and sealing appliance should be able to detect when a vacuum sealing appliance accessory hose is being used so that the heater bar is not activated and unduly used and exposed to wear and tear. Accordingly, the present invention is directed to a vacuum packaging and sealing appliance specifically configured to overcome these limitations in the prior art.

SUMMARY OF THE INVENTION

The present invention, like the prior art appliance 1, is an appliance that vacuums and seals plastic bag members containing a food product. This helps to preserve the food product within the plastic bag member for longer periods of time. The appliance includes each of a base portion and a lid portion, wherein the lid portion is hingedly attached to the base portion. The base portion includes a front wall member, rear wall member, and two side walls that together with the lid portion define a housing of the appliance. The base portion and the lid portion both preferably include sealing perimeters that, when the lid portion is closed relative to the base portion, abut one another and form a seal therebetween. The volume formed between the sealing perimeters when they abut one another defines the cavity in which a bag member may be inserted so that it can be vacuumed and subsequently sealed.

The appliance of the present invention improves upon prior art appliances in several ways. It allows for an operator to know when a bag member has been sufficiently inserted into the appliance as well as reduces the likelihood that the open side edge portions of a bag member are misaligned when the bag member is inserted into the appliance.

In the present invention, a drip tray is provided in the base portion of the appliance that, like the prior art drip tray 40, is designed to receive the open end portion of the bag member and to receive any moisture generated by a food product when a bag member containing food product is vacuumed. Unlike the prior art drip tray 40, however, the drip tray of the present invention includes a back barrier or wall member that extends across the width of the drip tray member. The back barrier member extends upwardly from the drip tray and is taller than a front portion of the drip tray. The back barrier member also preferably includes side wall portions that extend forwardly from the back barrier member and toward the front portion of the drip tray.

The back barrier member of the present drip tray provides a backstop that the bag member abuts when the bag member is sufficiently entered into the appliance so that a user knows when the bag member has been sufficiently inserted into the appliance. The back wall also helps to angle and force the open end of the bag member downwardly and into the drip tray for proper positioning within the vacuum chamber. This allows the bag member to be properly positioned in the vacuum chamber for the appliance to apply a vacuum force and seal the bag member after the lid portion has been closed. Because the back barrier member also includes side wall portions, a user is able to properly guide the bag member into the appliance in a proper direction, as the side wall portions will help to guide the bag member toward the back wall member.

In addition, the front wall member of the present appliance is also angled relative to the surface upon which the appliance sits. More particularly, in a preferred embodiment, the front wall member of the base portion is angled forward relative to the ground surface at a preferred angle of about 30.75°. However, the angle of the front wall member, and thus the base portion of the appliance, relative to the surface upon which the appliance sits may range between 15° and 45° and any inclination that may be beneficial as will be hereinafter explained.

Because the front wall member is angled relative to the support surface, the open end portion of the bag member being inserted into the appliance is closer to the support surface upon which the appliance sits. Thus, a user does not need to lift a bag member that includes a food product off of the support surface in order to insert it into the opening where the vacuum and sealing mechanisms are located. As such, the food product does not apply a downward force on the bag member, and the open side edge portions of the bag member may stay substantially aligned with one another during insertion into the vacuum chamber (unlike the top portions discussed in the prior art appliance 1). In short, the angle of the front wall assists in keeping a filled bag from sliding down the front of the appliance and out of the vacuum chamber. The front wall member being angled relative to the support surface also makes it easier for a user to see down into the base portion and its various components when the lid member is opened.

The present appliance may further include a port on its lid member having a sensor associated therewith to which an accessory hose associated with a vacuum sealing appliance like those known in the art used to vacuum seal food storage containers may be attached. When the accessory hose is inserted in the port associated with the sensor, the sensor is able to detect that the accessory appliance is being used. When the accessory appliance is in use, the sealing function of the present appliance is not needed. As such, when the hose for the accessory appliance is plugged into the port, the sensor instructs software of the appliance to short circuit or otherwise temporarily disable the heating bar that is ordinarily used to seal bag members when the appliance is used in the manner described above. By disabling the heating bar when the accessory vacuum sealing appliance is used, unnecessary wear and tear on the heating bar and unnecessary power consumption is reduced.

Each of the above improvements in the appliance of the present invention may be present alone or in combination with the other improvements. More details regarding the various improvements are set forth below.

BRIEF DESCRIPTION OF THE DRAWINGS

For a better understanding of the present invention, reference may be made to the following accompanying drawings.

FIG. 3 is a cross-sectional view of the vacuum packaging and sealing appliance of FIG. 2 and a bag member containing a food product being inserted into the appliance to be vacuumed and sealed;

FIG. 4 is a partial enlarged cross-sectional view of the vacuum packaging and sealing appliance of FIGS. 2-4 showing the drip tray and the route that the open end portion of a bag will take when inserted into the appliance.

DETAILED DESCRIPTION OF THE INVENTION

Figure 1:
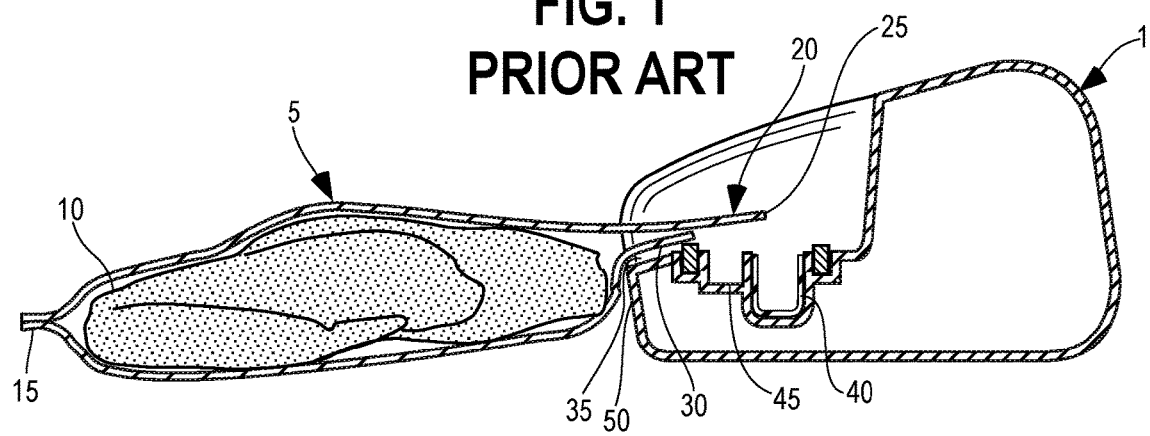
FIG. 1 is a cross-sectional view of a prior art vacuum packaging and sealing appliance and a bag member containing a food product being inserted into the prior art appliance to be vacuumed and sealed.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Figure 2:
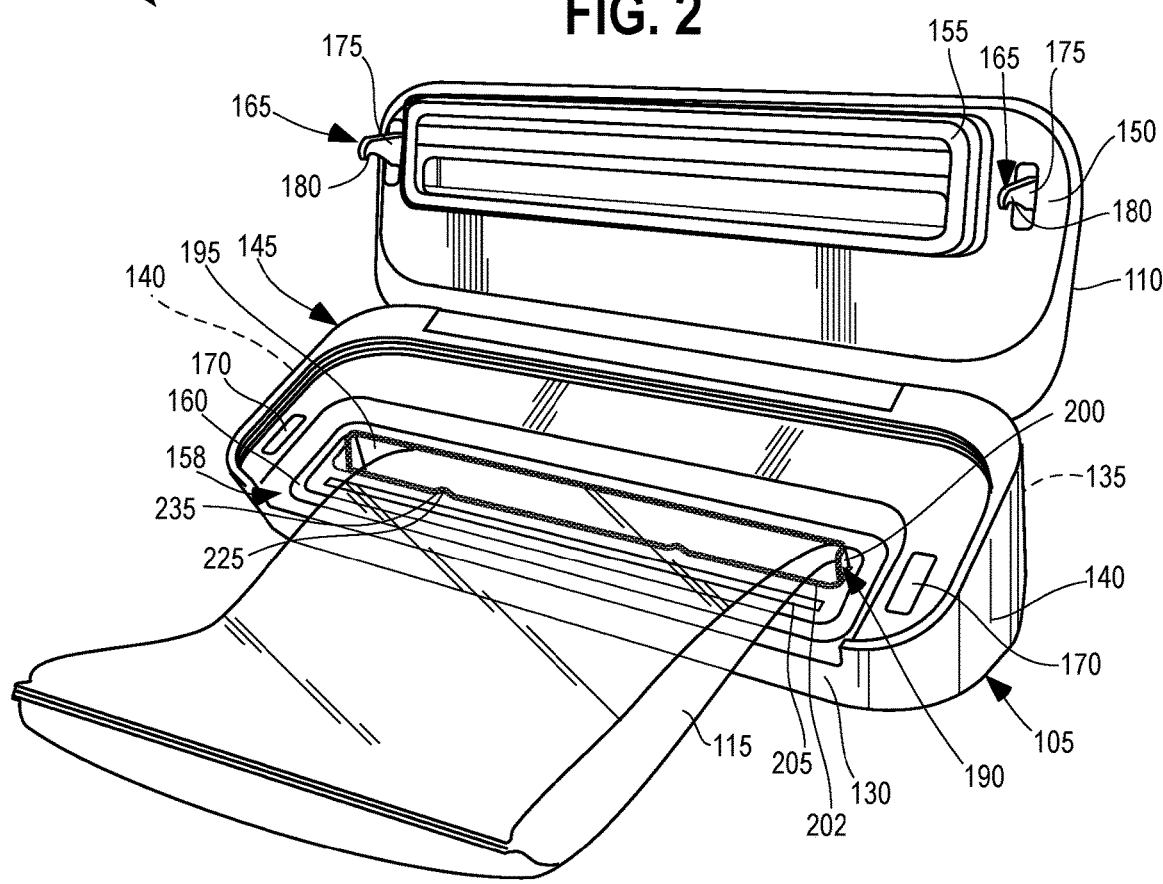
FIG. 2 is a perspective view of a vacuum packaging and sealing appliance constructed according to the teachings of the present invention.

Turning to FIGS. 2 and 3, an improved vacuum packaging and sealing appliance 100, hereinafter referred to simply as appliance 100, is provided. The appliance 100, like the prior art appliance 1, preferably includes a base portion 105 and a lid portion 110. In the illustrated embodiment of FIGS. 2 and 3, the base portion 105 has a quadrilateral cross section. The lid portion 110 likewise has a quadrilateral cross section. In alternative embodiments, the base portion 105, as well as the lid portion 110, may be other shapes. The base portion 105 preferably has the same cross section as the lid portion 110. The lid portion 110 and the base portion 105 are preferably hingedly attached to one another so that the lid portion 110 may be opened upwardly away from the base portion 105 to insert a bag such as bag member 115 therein. In the embodiment illustrated herein, the lid portion 110 and the base portion 105 are preferably attached to one another by a seamless hinge 120. The seamless hinge 120 may make it less likely that debris accumulated within the appliance 100 falls to a surface upon which the appliance 100 is located and may instead be trapped within the seamless hinge 120. In alternative embodiments, a traditional hinge may be used to connect the lid portion 110 and the base portion 105.

As illustrated in FIG. 2, the base portion 105 includes a bottom wall (not shown) which is enclosed by a front wall 130, rear wall 135, and sidewalls 140 to define, with the lid portion 110, a housing 145 of the appliance 100. An interior portion 150 of the lid portion 110 preferably includes a sealing perimeter 155 that extends downwardly therefrom. The sealing perimeter 155 of the lid portion 110 is preferably sized, shaped, and configured to abut and form a seal with a sealing perimeter 160 located on an interior portion 158 of the base portion 105 of the appliance 100. In the illustrated embodiment of FIG. 2, the sealing perimeter 155 is a substantially rectangular shape (with rounded corners).

The interior 150 of the lid portion 110 preferably further includes two hook members 165 that project downwardly therefrom, while the base portion 105 preferably includes two openings 170, or cavities, that extend downwardly into the base portion 105 for receiving the hook members 165. In alternative embodiments, more or fewer hook members 165 and openings 170 are envisioned. The hook members 165 may be hooks, having an elongated section 175 and a curved section 180. The curved section 180 of hook members 165 preferably engages structures (not illustrated) within the openings 170 when the lid portion 110 is closed, where the sealing perimeter 155 of the lid portion 110 is adjacent to and abuts the sealing perimeter 160 of the base portion 105. When an activation switch or button (described below relative to FIG. 5 as the operation switch 260) is activated, the hook members 165 engage the structures (not shown) in the openings 170 so that the sealing perimeters 155, 160 form an air tight seal surrounding a cavity formed therebetween (not illustrated) to create the vacuum chamber.

As illustrated in FIG. 4, the base portion 105 may further include an opening 185 in the front wall 130. The opening 185 may be an aperture that extends into and through the front wall 130 to create a cavity within the base portion 105. In the embodiment illustrated herein, the opening 185 is an elongated slot that substantially extends horizontally across the width of the appliance 100, along its front wall 130. When a bag such as the bag member 115 has been placed into the sealing appliance 100, for example by way of the opening 185 provided in the front wall 130 of base portion 105 of the appliance 100, a vacuum force may be applied in a known manner in the cavity formed by the sealing perimeters 155, 160 (best seen in FIG. 2) in order to remove air from within the bag member 115. Preferably, the bag member 115 includes structural channels or pockets (not shown) to allow airflow within the bag's interior and prevent the bag member 115 from being "pinched" closed. The vacuum may be applied from a number of different locations within the cavity or vacuum chamber formed by the sealing perimeters 155, 160 but in a preferred embodiment, the vacuum force is applied form a source adjacent to a drip tray 190, which is described below.

To use the appliance 100 to apply a vacuum force to the bag member 115, a user should first insert the bag member 115 through the opening 185. The lid portion 110 need not be opened relative to the base portion 105 to access the opening 185, and the user may simply insert the bag member 115 through the opening 185 without a need for opening the lid portion 110. Opening the lid portion 110 allows a user to better see the drip tray 190 and a back barrier 195 including side walls 200 (as seen in FIG. 2) associated therewith, as will be explained below. In one embodiment, the base portion 105 and lid portion 110 may be integrally formed together so that the lid portion 110 does not open and the front wall 130 of the base portion 105 will include an opening like the opening 185 along its width for insertion of the bag member 115.

Within the sealing perimeter 160 of the base portion 105, the drip tray 190 (shown in FIG. 4 in greater detail) is releasably received by a concave cavity 208 formed in the base portion 105 sized and shaped as to snugly receive the drip tray 190. Both the concave cavity 208 and the drip tray 190 preferably extend the width of the opening 185. In the illustrated embodiment, the concave cavity 208 and the drip tray 190 have a rectangular cross section, but may be other shapes in alternative embodiments. Furthermore, unlike the prior art drip tray 50, the drip tray 190 includes a back barrier member 195 that extends upwardly towards the lid portion 110 from a rear portion 198 of the drip tray 190 (best shown in FIG. 4). As shown most clearly in FIG. 2, side portions or side walls 200 project from the back barrier member 195 toward the front wall 130 of the appliance 100. A front portion 202 of the drip tray 190 is preferably substantially similar to the prior art drip tray 50 in that it preferably lies substantially flush with an adjacent heating bar 205.

The concave cavity 208, and thus the drip tray 190, is in communication with the opening 185. Therefore, when the bag member 115 is inserted into the appliance 100 by way of the opening 185, it may continue to be inserted into the appliance 100 until an open end portion 210, which includes a top and bottom edge portion 215 and 220 of the bag member 115, abuts the back barrier member 195. At that time, a user may continue to push the open end portion 210 of the bag member 115 into the appliance 100 so that the open top of the bag member 115 extends downwardly into the drip tray 190. A user may then know that the bag member 115 has sufficiently been inserted into the cavity (not shown) formed by the sealing perimeters 155, 160 and the sealing process may be initiated. Moreover, with the bag member 115 inserted so that its open end portion 210 has abutted the back barrier member 195, the top and bottom edge portions 215 and 220 of the bag member 115 are more aligned with one another. This is a vast improvement over the alignment of the top and bottom side edge portions 25, 30 of the bag member 5 associated with the prior art appliance 1. With the portions 215, 220 more in alignment with one another, the open end portion 210 of the bag member 115 is preferably more in alignment when the heating bar 205 is activated to initiate the sealing process.

Moreover, the side walls 200 prevent side-to-side misalignment as the bag member 115 is inserted into the appliance 100. If the bag member 115 is entered into the appliance 100 in a non-straight fashion or at an angle, the side walls 200 preferably act to redirect the top portion 215 of the bag member 115 toward the back barrier member 195.

As shown in FIG. 2, the drip tray 190 may include two inwardly arched recesses 225 located at its front portion 202. The arched recesses 225 may be channels that are shaped and sized so that they may receive projections 235, which may be protrusions, associated with the base portion 105 of the appliance 100. The projections 235 are preferably placed between the heating bar 205 and the drip tray 190 and may project from and be integrally formed with a top surface 240 of the base portion 105 of the appliance 100. The recesses 225 and projections 235 being engageable with one another preferably ensures that a user does not mistakenly put the drip tray 190 in backwardly when he or she has removed it for cleaning or another purpose and reinserted it into the base portion 105. If the drip tray 190 were inserted backwardly, the appliance 100 would not operate correctly because the bag member 115 would be blocked by the back barrier member 195 prematurely, and the bag member 115 could not be inserted sufficiently into the appliance 100 to complete the vacuuming and/or sealing process. In the illustrated embodiment, two recesses 225 and projections 235 are provided, but in alternative embodiments, more or fewer recesses and projections 225, 235 may be provided.

As best illustrated in FIG. 3, compared to the prior art appliance 1, the top surface 240 of the base portion 105 of the appliance 100, and thus the lid portion 110 of the appliance 100, are each angled relative to the support surface upon which the appliance 100 sits. More particularly, the front wall 130 of the appliance 100 is angled approximately 30.75° relative to the support surface upon which the appliance 100 rests. In alternative embodiments, the front wall 130 and thus the appliance 100 may be angled relative to the surface upon which the appliance 100 rests in a range between 15° and 45°, or at any inclination other than zero.

Because the appliance 100 is angled relative to the support surface upon which it rests, the opening 185 through which a bag, such as the bag member 115 is inserted, is closer to the support surface. With the opening 185 closer to the surface upon which the appliance 100 sits or rests, the bag member 115 with the food product 10 within does not need to be lifted off of the support surface in order for the open end portion 210 of the bag member 115 to be inserted into the opening 185. This height difference of the opening 185 helps to prevent the shortcoming of the prior art where the bottom side edge portion 30 of the bag member 5 is pushed downwardly by the weight of the food product 10, thus causing a misalignment between the top and bottom side edge portions 25, 30 of the bag member 5. Instead, the food product 10 in a bag when inserted into the improved appliance 100 applies a much lower (and potentially zero) gravitational force to the bag member 115, and more particularly its bottom side edge portion 220, thus improving the alignment of the top and bottom edge portion 215 and 220.

The angle of the appliance 100 also may help to prevent a filled bag such as the bag member 115 from sliding down the front wall 130 of the machine and out of the opening 185 and the interior of the appliance 100. The angled appliance 100 also allows an operator to more easily see the vacuum chamber contained within the appliance 100 and its associated heating bar 205, back barrier member 195, and side walls 200, to better align and seal a bag member such as the bag member 115. Moreover, because the appliance 100 is in the angle range specified and described above, the back barrier member 195 is also angled at substantially the same angle as the front wall 130, thus helping to direct the bag member 115 and its top portion 215 into the drip tray 190 to increase the likelihood that the open end of the bag member 115 will enter the drip tray 190.

Figure 5:
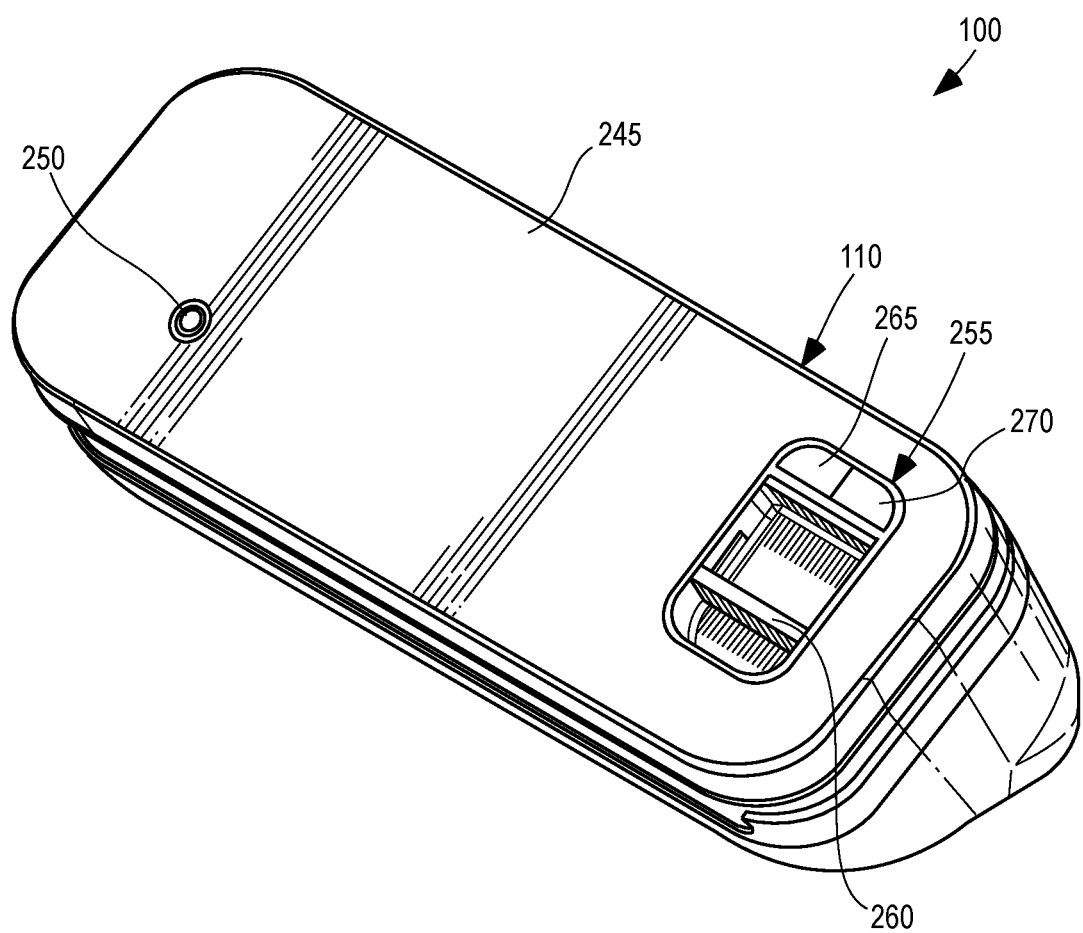
FIG. 5 is a top perspective view of the vacuum packaging and sealing appliance of FIGS. 2-4.

Turning now to FIG. 5, various controls and sensors of the appliance 100 are shown and illustrated. On a top portion 245 of the lid portion 110, an accessory port 250 including a sensor (not illustrated) is provided into which a hose (not shown) for use with a vacuum sealing accessory such as those described in the art may be releasably secured. The accessory sensor within the port 250 preferably detects whether an accessory hose has been attached to a vacuum sealing valve for use with a food storage container. In one embodiment, the accessory sensor may be an infrared light that senses whether the vacuum sealing accessory is in use through an infrared beam. When the accessory hose is plugged into the accessory port 250, the accessory hose blocks the beam of infrared light. Thus, when the accessory hose has been removed from the accessory port 250, the appliance 100 knows that the accessory hose is in use. In another embodiment, the beam of infrared light may be blocked by an additional internal sliding component instead. If an accessory is plugged into port 250, the sensor communicates with software associated with the appliance 100 and short circuits or otherwise temporarily shuts off the sealing mode as sealing is not necessary when using an accessory such as those described above. Because the sealing process involves heating of the heating bar 205, power may be saved to reduce wear and tear to the heating bar 205. This may help to extend the life of the heating bar 205.

A control panel 255 on the lid portion 110 preferably includes an operation switch 260 which must be pushed upwardly (or downwardly in alternative embodiments) in order to form an airtight seal between the sealing perimeters 155, 160, as described above. When the operation switch 260 is activated, the hook members 165 are further latched to the structures contained within the openings 170 and the airtight seal around the vacuum chamber is formed. With the sealing perimeter 155, 160 abutting one another and a seal formed therebetween, either of the vacuum or seal processes may be activated by activating either a vacuum button 265 or a seal button 270 on the control panel 255. When an accessory is plugged into the port 250, the sensor associated with port 250 may instruct the seal function and its associated button 270 to be temporarily disabled since the sealing feature is not necessary when an accessory is being used.

The above described appliance 100 includes each of a drip tray 190 having a back barrier wall member 195, an angled front wall 130, and a sensor associated with a port 250 to identify when an appliance accessory has been plugged into the appliance 100. Each of the aforementioned improvements are not necessary in any version of the appliance 100 and only one or two of those improvements may be present in any appliance like the appliance 100. Moreover, other variations and modifications to the various components comprising the present structures are also envisioned and contemplated.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations.

Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. An appliance for vacuum sealing a bag member having a closed bottom portion and an open top portion, the appliance comprising:
 a housing including a front wall member, a rear wall member, and two side walls, wherein the front wall member of the housing is angled between 15° and 45° relative to a bottom surface of the housing;
 an opening in the front wall member of the housing for receiving the open top portion of the bag member;
 a cavity within the housing into which the open top portion of the bag member may be received and in which a vacuum pressure may be applied;
 a heating bar contained within the cavity, the heating bar used to apply a seal to the open top portion of the bag member;
 a drip tray within the cavity in which the open top portion of the bag member is receivable when vacuum pressure is applied within the cavity; and
 a barrier member formed on a rear portion of the drip tray that extends upwardly from the drip tray, the barrier member positioned to redirect the open top portion of the bag member into the drip tray when the bag member has been sufficiently inserted into the opening in the front wall member.

2. The appliance of claim 1 including a port for receiving a vacuum sealing appliance accessory for applying a vacuum force to a food storage container, said port having a sensor associated therewith, said sensor instructing software associated with the appliance to temporarily disable the heating bar when the accessory is engaged with the port.

3. The appliance of claim 2 wherein the sensor is an infrared light, the vacuum sealing appliance accessory blocking the infrared beam when the vacuum sealing appliance is engaged with the port.

4. The appliance of claim 2 wherein the sensor is an infrared light, the port having an internal sliding component to block the infrared beam for sensing whether the vacuum sealing appliance is in use.

5. The appliance of claim 1 wherein the front wall of the housing being angled 30.75° relative to a surface on which the appliance rests.

6. The appliance of claim 1 wherein the drip tray includes a front portion, the front portion being substantially flush with the heating bar.

7. The appliance of claim 1 wherein the cavity includes at least one projection, the drip tray includes at least one recess, the at least one projection and the at least one recess may selectively engage each other.

8. The appliance of claim 1 wherein the barrier member includes side walls extending from each opposite end portion thereof.

9. The appliance of claim 1 wherein a base portion and a lid portion engages each other through a seamless hinge.

10. An appliance for vacuum sealing a bag member having a closed bottom portion and an open top portion, the appliance comprising:
 a housing including a front wall member, a rear wall member, and two side walls;
 an opening in the front wall member of the housing for receiving the open top portion of the bag member;
 a cavity within the housing into which the open top portion of the bag member may be received and in which a vacuum pressure may be applied;
 a heating bar contained within the cavity, the heating bar used to apply a seal to the open top portion of the bag member;
 a drip tray within the cavity in which the open top portion of the bag member is receivable when vacuum pressure is applied within the cavity;
 a barrier member formed on a rear portion of the drip tray that extends upwardly from the drip tray, the barrier member positioned to redirect the open top portion of the bag member into the drip tray when the bag member has been sufficiently inserted into the opening in the front wall member;

the drip tray further including two sidewalls extending from the barrier member, located and positioned on opposite ends of the barrier member; and the front wall member of the housing being angled between 15° and 45° relative to a bottom surface of the appliance.

11. The appliance of claim 10 including a port for receiving a vacuum sealing appliance accessory for applying a vacuum force to a food storage container, said port having a sensor associated therewith, said sensor instructing software associated with the appliance to temporarily disable the heating bar when the accessory is engaged with the port.

12. The appliance of claim 11 wherein the sensor is an infrared light, the vacuum sealing appliance accessory blocking the infrared beam when the vacuum sealing appliance is engaged with the port.

13. The appliance of claim 11 wherein the sensor is an infrared light, the port having an internal sliding component to block the infrared beam for sensing whether the vacuum sealing appliance is in use.

14. The appliance of claim 10 wherein the cavity includes at least one projection, the drip tray includes at least one recess, the at least one projection and at least one recess may selectively engage.

15. The appliance of claim 10 wherein the front wall of the housing being angled 30.75° relative to a surface on which the appliance rests.

16. The appliance of claim 10 wherein the drip tray includes a front portion, the front portion being substantially flush with the heating bar.

17. A drip tray, able to selectively receive an open top portion of a bag member, comprising:
a barrier member formed on a rear portion of the drip tray that extends upwardly from the drip tray, the barrier member positioned to redirect the open top portion of a bag member into the drip tray when the bag member has been sufficiently inserted into an appliance for vacuum sealing;
two sidewalls extending from the barrier member, located and positioned on opposite ends of the barrier member;
the drip tray being selectively engageable in a cavity located and positioned in a housing of the appliance, wherein the housing includes a front wall member, a rear wall member, and two side walls, the front wall includes an opening for receiving the open top portion of the bag member, and the front wall member of the housing being angled between 15° and 45° relative to a bottom surface of the appliance;
a heating bar also located and positioned within the cavity, the heating bar used to apply a seal to the open top portion of the bag member when the open top portion of the bag member is inserted into the cavity of the housing where vacuum pressure may be applied.

* * * * *